United States Patent [19]

Murray

[11] Patent Number: 4,677,007
[45] Date of Patent: Jun. 30, 1987

[54] THERMOPLASTIC SACK

[75] Inventor: Charles R. Murray, Toronto, Canada

[73] Assignee: C-I-L, Inc., North York, Canada

[21] Appl. No.: 797,918

[22] Filed: Nov. 14, 1985

[30] Foreign Application Priority Data

Nov. 30, 1984 [CA] Canada .................................. 469122
Dec. 20, 1984 [CA] Canada .................................. 470686
Apr. 1, 1985 [CA] Canada .................................. 478052

[51] Int. Cl.⁴ ....................... B65D 30/02; B29C 41/00
[52] U.S. Cl. ....................................... 428/35; 428/36; 428/516; 264/564
[58] Field of Search .................. 428/36, 35, 910, 516; 264/564

[56] References Cited

U.S. PATENT DOCUMENTS

4,169,910 10/1979 Graboski ................................ 428/35
4,547,551 10/1985 Bailey et al. ........................ 525/240
4,576,844 3/1986 Murray et al. ........................ 428/35

Primary Examiner—John E. Kittle
Assistant Examiner—James J. Seidleck
Attorney, Agent, or Firm—Cushman, Darby & Cushman

[57] ABSTRACT

A shipping sack having walls formed of uni-axially oriented linear low density polyethylene film wherein said film is produced by blowing and cold drawing said polyethylene at a draw ratio to blow ratio of greater than 1:1, preferably, between 2:1 and 5:1. The sack can be used as a tubular shipping sack for bulky, lightweight material or, if optionally provided with a double inner film of low density polyethylene, as a heavy duty sack. The sacks have improved physical properties.

16 Claims, 8 Drawing Figures

THERMOPLASTIC SACK

BACKGROUND OF THE INVENTION

This invention relates to thermoplastic sacks formed of uni-axially oriented linear polyethylene films and, more particularly, to both tubular and heavy duty shipping sacks.

Thermoplastic sacks are used in the packaging, transportation or storage of a great variety of materials ranging from powders and granules, bulky and lightweight materials, and agricultural materials such as hay and silage. The thermoplastic sacks according to this invention have general applicability to such products.

Bulky but lightweight materials such as fiberglass insulation and peat moss are generally shipped in compressed form in thermoplastic sacks. These sacks are generally known as tubular insulation sacks or bags and take the form of an extended envelope or tube sealed at one end prior to its being filled with product. For the most part these sacks are produced by the commonly known in the art "blown film" process, which owes its popularity to the fact that it can be quickly and readily adapted to the production of different widths and thicknesses of continuous tubes which can then be easily cut to length and sealed at one end to produce an open top sack.

It will be readily appreciated that the thinner the film thickness (gauge), commensurate with acceptable film properties, the less the amount of thermoplastic material required. This downgauging of sack wall thicknesss is a most desirable industrial goal. Walls of sacks produced as tubes by the blown film process, typically, have a film thickness in the range of 3-6 mil ($75-150 \times 10^{-4}$ cm) which is generally determined by the machine direction (M.D.) tensile strength necessary to handle the package weight, the film stretch resistance required to prevent expansion of the compressed product and the puncture resistance of the bag for distribution handling. The tubes from which these sacks are commonly made are produced with a bubble diameter/die diameter generally of 3:1 in order to optimize film strength properties.

Although various attempts have been made to use high density polyethylene for the manufacture of downgauged bags because of its high stretch resistance and tensile strength these have largely been abandoned because of poor tear resistance and puncture properties. In view of this, polyethylene insulation sacks are most commonly made from resins which have superior tear resistance and puncture properties such as low density or linear low density polyethylene.

It is well known in the art to produce polyethylene films having enhanced puncture, tensile strength and stretch resistance by the process of uni-axially cold drawing the film below its melting point. However, because of the unbalanced physical properties e.g. poor M.D. tear strengths, of these oriented films, which causes "splittiness", they have been ignored for use in tubular shipping sacks.

SUMMARY OF THE INVENTION

Surprisingly, we have now found that by the correct selection of film blow up ratio (BR) and draw ratio (DR) of blown and drawn linear polyethylene film a uni-axially oriented film having good M.D. tear resistance can be produced suitable for use in a downgauged shipping sack.

Accordingly, the invention provides a thermoplastic sack comprising film formed of uni-axially oriented linear low density polyethylene film produced by blowing and cold drawing linear low density polyethylene at a draw ratio to blow ratio (DR/BR) of greater than 1:1.

By the term "Draw Ratio" is meant the ratio of the length of drawn film to the length of undrawn film, and by the term "Blow Ratio" is meant the ratio of the bubble diameter to the die diameter. Such terms are well known in the art.

We have found that ratios of DR/BR of <1:1 results in films having unacceptable M.D. tear properties, whereas values of at least 2:1 are preferred, although ratios >5:1 are impractical to obtain.

Accordingly, in a preferred feature, the invention provides a thermoplastic sack formed of uni-axially oriented linear low density polyethylene film produced by blowing and cold drawing linear low density polyethylene at a draw ratio to blow ratio of between 2:1 and 5:1.

We have thus found that a shipping sack having improved film stretch resistance and high tensile strength in addition to acceptable tear resistance comparable to that for non-oriented film and in contrast to the expected usually reduced tear resistance for uni-axially oriented polyethylene film can be manufactured.

The linear low density polyethylene may, optionally also contain a minor amount of high density polyethylene when extra heat resistance is required of the sack.

We have further found that by blending in a minor amount of high pressure process (i.e. non-linear) low density polyethylene resin with the linear low density polyethylene resin a uni-axially oriented film having further enhanced tear properties can be produced. In addition, we have found that these resin mixtures also provide enhanced bubble stability during the blown film process and facilitate the manufacturing process.

Accordingly, in a more preferred feature the invention further provides a thermoplastic sack as hereinbefore defined wherein said linear low density polyethylene contains a minor amount of low density polyethylene.

The amount of low density polyethylene present in the polyethylene blend prior to blowing into film can be readily determined by the skilled man to be that amount which provides acceptable enhanced tear properties. Typically, the blend comprises 20% low density polyethylene and offers uni-axially oriented film for use in shipping sacks according to the invention which could be downgauged by 30%.

The typical blown film process basically comprises the steps of extruding molten thermoplastic material through a circular die, typically of 0.05" diameter gap, to form a tube which is closed by passing the end through a set of nip/draw rolls. Air is introduced through the die centre to inflate the tube to the selected width while the speed of the nip rolls is increased to draw the film down to the desired gauge. At this stage the flattened film tube is, optionally, passed to a corona discharge unit to burn the film surface to make it receptive to ink application when next passed through a flexographic stack press. The tube is then reinflated by passing it through two sets of nip rolls with an air bubble trapped between them while the edge of the tube is tucked by forming plates just prior to the second set of nips in order to form any required gusset in the tube. The tube finally passes to an end seal head where it is heat sealed and guillotined to the required sack length.

Although it is preferable when extruding to use a maximum die size to obtain highest output rates, low density polyethylene is commonly extruded with much smaller dies to give blow ratios of between 2-3 to provide film impact strangth, especially on the edge folds of the flattened tube.

In the blown film process for the manufacture of sacks according to the invention the above general process is modified in several ways. The first change is that the die diameter used is increased by a factor of 2-3, depending on the desired bag layflat width, over the die diameter used at present in the industry for the manufacture of thermoplastic tubular sacks. The second change is that a cold drawing section is introduced between the bubble nip and the corona treatment unit. Such a section may consist of an initial series of heating rolls to raise the film temperature to a point, e.g. ca. 105° C., where a minimum of force is required for cold drawing and a series of closely spaced rolls through which the heated film passes to a set of cooling rolls to bring the film temperature to ambient. The spacing between the closely spaced rolls is, typically, 0.13 mm plus film thickness. The film is then passed to a set of pull nips running at linear speed, typically, of four times greater than the bubble nip draw rolls.

The blown film thickness is typically four times greater than the required thickness of the finished sack. Thus, since the desired finished sack film thickness is typically 2-3 mil the initial blown film thickness must be 8-12 mil. Because it is extremely difficult to control blown film thickness of gauges greater than 12 mil the use of DR/BR values higher than 5:1 becomes impractical.

The above general process has been modified in yet several more ways. It is known in the art that when a tubular film is cold drawn it emerges from the draw nip rolls with exceedingly weak (ca. 10 gm/mil) edgefold strength as measured by the standard dart impact test. Such an edgefold strength does not provide tubular film suitable for shipping sack use. Surprisingly, we have found that by the process of heat annealing the edgefolds at a temperature ca. 80° C. the fold impact strength can be increased up to the order of 30 gm/mil, to provide film suitable for tubular shipping sacks.

We have also found that excessive "blocking" or internal heat tacking of the walls of the tubular film during the cold drawing process may be overcome by the addition of an inorganic filler e.g. silica or calcium carbonate powder, at a typical concentration of 1% w/w to the formulation.

The heat seal produced in the tube, i.e., the two flattened sides (films) of the tube, by the end seal head in the process hereinabove described is produced under a combination of pressure and heat, at or above the films' crystalline melting point, applied to the films in order that they are truly welded at their interfaces such that a clean separation cannot be effected by physical or chemical means. It is known that heat build-up during the sealing operation may be sufficient to destroy the orientation of uni-axially oriented films in the vicinity of the heat seal and thus cause serious loss of draw-induced impact strength. We have found that sacks manufactured by the process hereinbefore described have sufficient impact strength suitable for the intended light duty purpose for which the sacks are made. Further, we have found that the most valuable tear resistance properties of the film are not significantly reduced in contrast to the expected usually reduced tear resistance for uni-axially oriented polyethylene film. Thus, an acceptable bridge between the uni-axially oriented film and the body of the seal is formed and permits the manufacture of an improved tear resistant sack having acceptable impact resistance.

It is thus been found that a suitable open-top tubular polyethylene shipping sack having improved puncture resistance and M. D. tensile strength, while still retaining acceptable tear and edgefold impact strength, can be manufactured using suitably modified conventional blown film process apparatus.

By the term "tubular shipping sacks" is meant sacks having a resultant shape generally of a tube, optionally provided with gussets, whether made by the specific process as hereinbefore described or by alternative processes known in the art which may or may not involve the "back-sealing" of an oriented film.

In addition, tubular shipping sacks of alternative structure to the simple open-top sack described hereinabove and utilizing the feature of the invention to provide the promised advantages may be produced. Such an alternative tubular sack is the type known as a "valved bag" shipping sack, which is closed at both ends of the tube and has a self-closing valve structure at an upper side or end.

Such alternative bags may be made by conventional processes well-known in the art suitably modified to provide a sack formed of uni-axially oriented linear polyethylene film produced by blowing and cold drawing at the aforesaid draw ratio to blow ratio.

Also included within the scope of the invention are those shipping sacks incorporating the feature of the invention wherein the seals or other closures provided in the sacks are formed by adhesive bonding as an alternative to heat sealing. Use of such adhesive bonding provides the advantages promised hereinabove and also improved impact resistance to the sack. This preferably permits use of such sacks for the packaging of bulky and lightweight materials such as, for example, vermiculite insulation material.

Accordingly, the invention provides a thermoplastic sack having a front wall and a back wall, each of said front wall and said back wall comprising a ply of said uni-axially oriented linear polyethylene, said ply being produced by blowing and cold drawing said linear polyethylene at a draw ratio to blow ratio of greater than 1:1.

While the foregoing disclosure has made particular reference to thermoplastic sacks in the form of tubular sacks suitable for use with lightweight and bulky materials, we have found that the aforesaid sacks can be suitably modified to provide an improved heavy duty thermoplastic shipping sack. Such sacks may be used for the transportation, packaging and storage of a wide variety of products in granular or powder form. These sacks may also be of the open-top type, requiring separate provision for closing, or fitted with a valved opening.

Disclosed in our copending U.S. application Ser. No. 631,540 filed July 16, 1984, are heavy duty shipping sacks comprised of a double layer of non cold-drawn low density polyethylene interposed between two plies of cross-laminated uni-axially oriented linear polyethylene film.

However, we have now found that a much cheaper thermoplastic shipping bag than the aforesaid cross-laminated structured bag can be manufactured having both excellent heat sealability and puncture resistant properties.

We have surprisingly found that two layers of low density polyethylene can be welded to each other between and to two uni-axially oriented films or plies constituting the walls of a shipping bag without there being sufficient heat build up to cause serious loss of cold draw-induced film strength. Thus an acceptable bridge between a high strength uni-axially oriented film and the body of the heat seal is formed. This is to be contrasted with the fact that although two uni-axially oriented films in the absence of interposed low density polyethylene film could be melted and fused together to produce welded bonds, the uni-axially oriented film immediately adjacent to the welded mass has its cold draw orientation reduced by the heat from the seal with consequent reduction of film strength in this margin area; whereby the seals so produced are sufficiently weak and brittle in the margin area, so as to render them unacceptable for use in heavy duty shipping bags.

It has thus now been found that a suitable thermoplastic shipping bag having improved puncture and snag resistance can now be reliably manufactured by heat sealing techniques using suitably modified conventional equipment.

Thus, in a further aspect the invention provides a thermoplastic shipping bag having a front wall and a back wall, each of said front wall and said back wall comprising a ply of uni-axially oriented linear polyethylene produced by blowing and cold drawing said linear polyethylene as hereinbefore defined; and wherein interposed between said plies are two inner layers of low density polyethylene.

Each of the interposed layers of low density polyethylene may constitute simply a sheet of polyethylene laminated to a surface of a uni-axially oriented ply and being of sufficient thickness in the heat seal area to effect an acceptable bridge between the two uni-axially oriented plies in this area to form a seal. However, each of these interposed layers of low density polyethylene may extend beyond the heat seal area to represent a laminated layer on the respective full surface of each of the uni-axially oriented plies. Thus, each of the uni-axially oriented plies comprising the walls of the shipping bag have a layer of low density polyethylene laminated thereto. Such a structure, of course, does not detract from the requirement that the uni-axially oriented plies need only be heat sealed at designated heat seal areas. These areas constitute those parts of the bag, generally parts of the periphery, where the front and back walls are joined by heat sealing during manufacture.

Where the layers of low density polyethylene are represented as laminated sheets on the uni-axially oriented plies, each of the sheets must be of sufficient thickness to effect an acceptable bridge between the two uni-axially oriented plies. We have found that a mere coating of low density polyethylene on each of the cross-laminated plies is not sufficient, and that a minimum thickness of 0.5 mil of low density polyethylene is required, preferably >1.5 mil.

We have also found that both of the uni-axially oriented plies constituting the walls of the sack must have a laminated sheet of low density polyethylene to provide an acceptable heat seal for heavy duty bag use. A single interposed layer of low density polyethylene, represented either as a laminated sheet or as a distinct ply, is not satisfactory. Thus, a double layer of polyethylene is required.

In a much preferred form of a sack according to the invention the interposed layers of low density polyethylene represent full and distinct plies constituting part of the walls of the sack.

Accordingly, the invention further provides a sack as hereinbefore described wherein each of said layers of low density polyethylene constitutes an inner ply of the bag.

In this preferred form of sack each of the walls comprising a uni-axially oriented ply has an interposing ply of low density polyethylene associated therewith. In this arrangement, each of the interposing plies may be considered as being an inner wall of the sack while the two uni-axially oriented plies are considered as being the two outer walls.

The terms "inner wall" and "inner ply" are meant not to be restricted solely to the actual or true inner wall or ply of the sack which contacts product when the sack is filled. The terms also include the situation, for example, where one or more plies of non-oriented low density polyethylene constitute plies in a multi-wall sack which plies may or may not be adjacent the true inner wall or ply. Similarly, the terms "outer wall" or "outer ply" are meant not to be restricted solely to the most external wall or ply.

Thus, it should be understood that the principles of the invention are applicable also to the fabrication of sacks having walls individually comprising more than two plies. Thus, the invention embraces sacks having three plies, four plies, etc. The important feature for a heavy duty sack is that there must be either a laminated layer of or at least one ply of non-oriented low density polyethylene constituting each of the inner surfaces or inner walls of the sack such that a uni-axially oriented ply of linear polyethylene does not contact another uni-axially oriented ply of linear polyethylene at a designated heat seal area of an inner surface such as to weaken a heat seal when heat seal strength is a desired feature.

In preferred embodiments of the heavy duty sacks according to the invention as hereinbefore and hereinafter defined the interposed layer of low density polyethylene represented either as a laminated sheet on the uni-axially oriented ply or as a distinct inner ply or inner wall, is formed of blown linear low density polyethylene. However, it is readily apparent that cast films are also suitable for this application.

A two-ply sack is the simplest embodiment of this heavy duty sack. However, in some instances, it is advantageous to have more than two inner plies of non-oriented film constituting the inner layers of the sack, i.e., between the front and back uni-axially oriented outer sides of the sack. An example of this would be a sack of the simplest embodiment with an additional thin true inner ply of linear low density polyethylene in the form of a fine filter mesh to allow air to be filtered from powdered products, as described in our copending U.S. application Ser. No. 632,522, filed July 19, 1984.

In other instances it may be preferred to have additional plies of film outermost of the uni-axially oriented ply. Such an outer ply could give the benefit resulting from introducing blown low density polyethylene film between the gussetted surfaces of uni-axially oriented plies to give the same improvements in seal quality as created on the innermost parts of the bag. The squared-off appearance of the final package resulting from this gussetting improves its performance for palletizing and stacking.

An additional benefit to be gained from such an outer layer is that the surface can be suitably roughened by the addition of high molecular weight granules to the film during film extrusion; thus, imparting additional improved handling properties to the sack. As well, the inner surface of this outer ply can be printed and the resulting message thus locked between plies to escape abrasion and distortion during the handling of filled packages. It can easily be seen that the utility of this outer ply can be expanded by using a laminate or coextrusion film to impart special properties to the bag, i.e., oil barrier or grease resistant layers.

The utility thus lies in the fact that by the introduction of a double layer of a non cold-drawn low density polyethylene film between the mating surfaces of two uni-axially oriented polyethylene films both open top and valved top type heavy duty shipping sacks, suitable for the packaging of expensive or hazardous materials, can be reliably manufactured using commonly available heat seal sack making equipment.

The open-top shipping sack for heavy duty use may be made by feeding a web of the uni-axially oriented film in conjunction with an inner web of blown low density polyethylene through commercial side-weld, heat sealed or back seamed and bottom heat sealed bag making equipment.

One particularly useful type of a thermoplastic shipping sack is that known as a valved bag. One such embodiment is described in our U.S. Pat. No. 3,833,166. These bags possess the important commercial advantage of being easily filled through a valve structure with the self-closing of this valve structure after filling. The heavy duty sacks according to the invention are of particular value in the form of a valved bag.

The term "low density polyethylene" includes low density ethylene homopolymers and copolymers, such as the linear low density polyethylenes, vinyl acetate copolymers, and blends thereof.

The term "linear low density polyethylene" as used within this specification and claims includes linear low density ethylene copolymers with the lower olefins such as, for example, butene, n-hexene, 4-methyl 1-pentene and octene.

While it is generally accepted that all polyethylene film is generally uni-axially oriented to some degree, the term "uni-axially oriented" when used with reference to linear polyethylene in this specification and claims means polyethylene film that has been blown and cold drawn to at least a 2.5-fold extent, preferably to a 4-fold extent, but also up to a 6-fold extent. The orienting of the films may be carried out by the cold drawing of the blown tube as hereinbefore described.

The cold drawn uni-axially oriented film of use in the invention made from linear low density polyethylene resins and low density polyethylene blends thereof can be used in a variety of thicknesses. One particular blend of use in the practice of the invention comprises linear low density and low density polyethylenes in the ratio of 4:1.

Also included within the scope of the invention are single ply tubular shipping sacks having walls formed of a co-extruded laminate comprising a layer of uni-axially oriented linear polyethylene produced as hereinbefore defined and a layer of a low density ethylene polymer or copolymer compatible with said uni-axially oriented linear polyethylene. Examples of such compatible copolymers of use in the invention are ethylene-vinyl acetate copolymers, ethylene-ethyl acrylate copolymers and ethylene-methyl methacrylate copolymers.

It is well-known in the art to co-extrude such a two or more polymer system to form a laminate by means of conventional co-extrusion equipment. However, in the process according to the invention as is applicable to a laminate the compatible ethylene polymer or copolymer is also subjected to the novel same draw ratio to blow ratio (DR/BR) subsequent to the co-extrusion step as is the uni-axially oriented linear polyethylene.

The compatible ethylene polymer or copolymer layer of the laminate may constitute either the inner surface or the outer surface of the sack to provide additional utility to the sack. For example, where the compatible polymer or copolymer of the laminate is a soft-flexible copolymer, such as 10% ethylenevinyl acetate, providing an external surface of the sack it provides superior anti-slip properties. Where a 20% ethylenemethyl acrylate copolymer of the laminate provides the inner layer of the sack, the sack may generally be heat sealed at temperatures as low as 80° C. which reduces the risk and degree of disorientation of the vulnerable oriented layer.

The co-extruded laminate may comprise two or more compatible layers as is deemed appropriate.

Also embraced within the scope of this invention are sacks formed of films comprising a laminate formed by adhesive lamination of suitable films.

Multi-laminated plies may be used wherein one laminate layer constitutes a barrier layer to the movement of chemical vapour through the sack walls.

Accordingly, the invention provides an open-top tubular shipping sack as hereinbefore defined wherein said film or ply of uni-axially oriented linear low density polyethylene forms part of a multi-layer laminate with one or more layers of one or more compatible ethylene polymers or copolymers.

In a further aspect, the invention provides a thermoplastic film suitable for use for a shipping sack said film formed of uni-axially oriented linear low density polyethylene powdered by the blowing and cold drawing of said polyethylene at a draw ratio to blow ratio as hereinbefore defined.

In yet a further aspect, the invention provides a thermoplastic film as hereinabove defined and wherein said film forms part of a multi-layer laminate with one or more layers of one or more compatible ethylene polymers or copolymers. The layer of the compatible ethylene polymer is at least 0.5 mil thick and, preferably, at least 1.5 mil thick.

Preferably, the compatible ethylene polymer is low density polyethylene.

Several embodiments of this invention will now be more particularly described by way of example only with reference to the accompanying drawings, in which:

DETAILED DESCRIPTION OF THE PREFERRED EMBODIMENT

Figure 1:
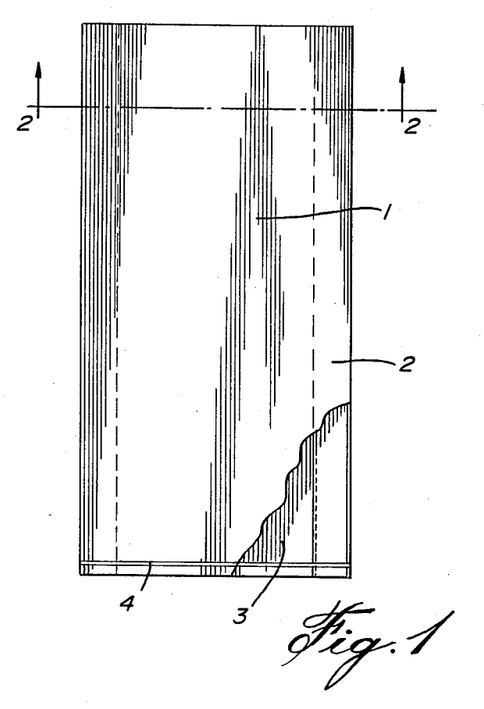
FIG. 1 shows a front elevational view, partly cut away, of an open-top tubular sack according to the invention.
Figure 2:
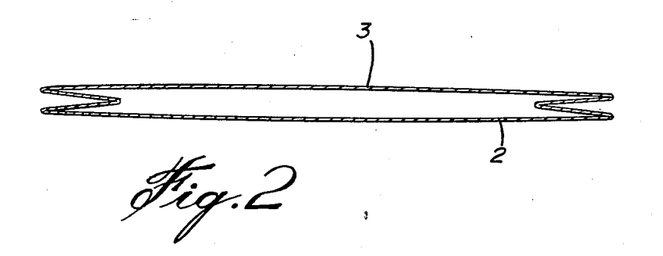
FIG. 2 is a sectional view along 2—2 of FIG. 1.

FIGS. 1 and 2 show a generally rectangular single ply tubular sack 1 having a front wall 2 and a back wall 3 formed of a blown and cold drawn polyethylene blend consisting of linear low density polyethylene (4 parts, density 0.918, melt index 0.5—ESCORENE 1030* from ESSO CHEMICAL") and low density polyethylene (1 part, density 0.923, melt index 0.3—CIL 503*—1% silica). One end 4 of the tubular sack is heat sealed to form a single ply open-top sack.

The sack is made by extruding the above resin blend and blowing, cold drawing and heat annealing the film on modified conventional equipment. The flattened tube (27" width) is fed to an end seal head where it is heat sealed and guillotined to a bag length of 60". The flattened tube width reduces to a tubular sack width of 16" with the provision of two 5½" gussets. The process is operated with the parameters as given for resin No. 8 in the Table hereinbelow. The sack has a most valuable tear resistance of 240 gm/mil and an edgefold impact strength of 30 gms/mil, while having improved puncture resistant and M.D. tensile strength.

Figure 3:
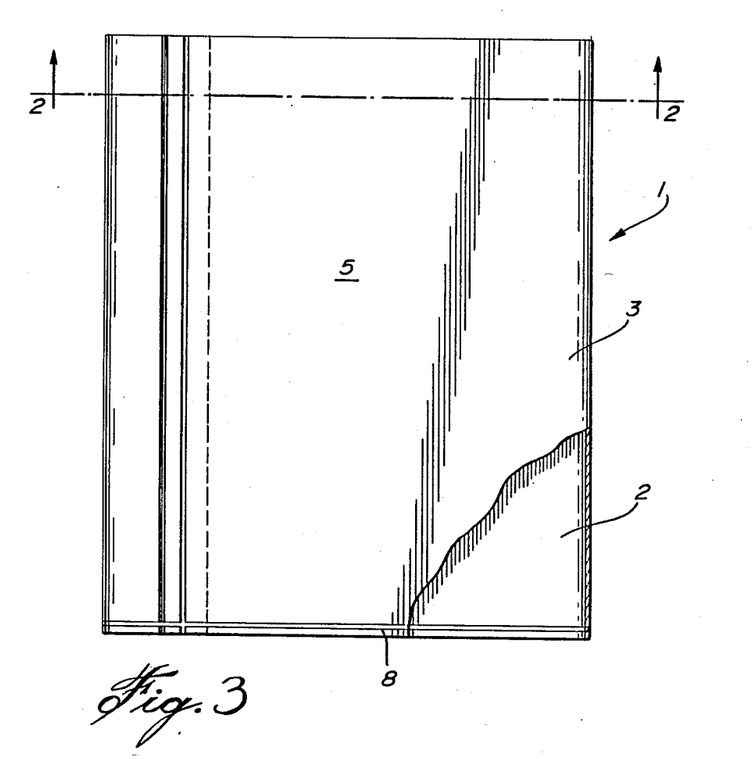
FIG. 3 is a front elevational view of an open-top heavy duty sack according to the invention.
Figure 4:
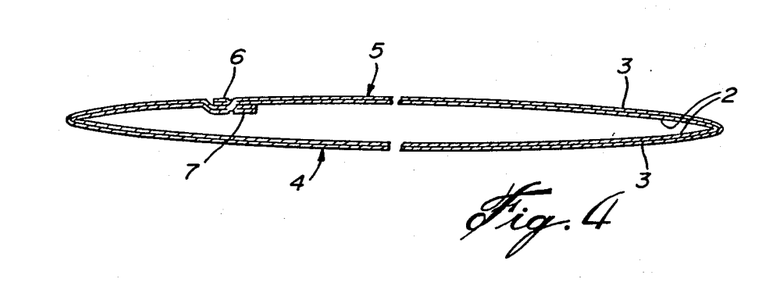
FIG. 4 is a sectional view along line 2—2 of FIG. 3.

A series of films was blown from ESCORENE 1030* (LLDPE) resin and CIL 503* (LDPE) resin at different blow ratios. These were subsequently cold drawn below their crystalline melting point at different draw ratios and tested for M.D. tear resistance. The process parameters and results are given in the following Table.

heat sealing with layer 2 in the overlapping panels 6 and 7. Thus, the walls 4 and 5 are integral and form a two-ply tube. One end of the tube 8 is heat sealed to form a simple two-ply open-top bag.

The sack is made by feeding a web of 37" film 3 into a longitudinal folding frame with a web of film 2 and forming a two-ply tube 18" wide with a 1" overlapping portion. The four plies of the overlapping area are then heat sealed longitudinally to consolidate the two-ply tubing which is then passed to a transverse heat seal unit to make the bottom seal 8. A 26" length of tube with the heat seal present is cut from the web by a guillotine to form the open top bag 1.

To test the strength of the heat seals, sack 1 was filled with 50 pounds of granular salt, heat sealed at its open end by a "Dough boy" heat sealer, and drop tested on each side, edge and butt from a height of 10 feet. There was no rupture of any film or seal. The open top of the sack is generally heat sealed after filling with product to produce an airtight and watertight package. Because it is extremely difficult to exclude all air from the filled package prior to the heat sealing operation, it is preferable to perforate the walls of the bags with pinholes typically 0.025" in diameter to facilitate air release, the number of holes required depending on the amount of air left in the bag and the type of product being packaged. In those cases where it is critical that the package retains its maximum value for air tightness and moisture protection, the perforation holes in the inner and outer plies are offset typically by 1½" to create an indirect path to air-product mixes during the venting period.

Although the inner ply 2 of the sack is described as a single ply of sheeting it can be readily appreciated that a two-ply tube of 1.5 mil could also be used instead. Indeed, since tubing may be less expensive to manufacture the tube could be a preferred option.

Figure 5:
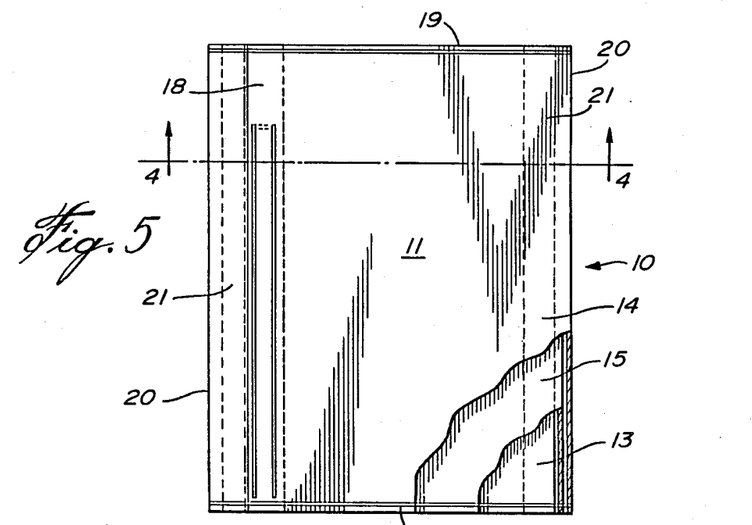
FIG. 5 is a front elevational view of a heavy duty valved bag according to the invention.
Figures 6, 7, 8:
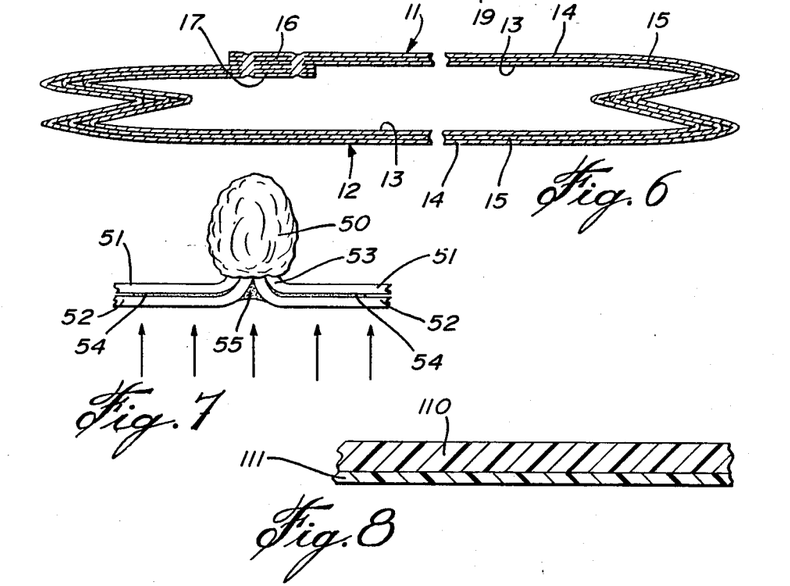
FIG. 6 is a sectional view along the line 4—4 of FIG. 5.
FIG. 7 is a diagrammatic view of a section through a heat seal used in the practice of the invention.
FIG. 8 is a cross-sectional view of a preferred laminate of a thermoplastic material according to the invention.

FIGS. 5 and 6 show a generally rectangular three-ply pillow-type bag 10 having a front side 11 and a back side

TABLE

| No. | Resin (ESCORENE 1030) | Blown Thickness (micron) | Drawn Thickness (micron) | Draw Ratio | Blow Ratio | DR/BR | Tear (gms/mil) |
|---|---|---|---|---|---|---|---|
| 1 | | 225 | 75 | 3:1 | 3:1 | 1:1 | 20 |
| 2 | | 150 | 25 | 6:1 | 3:1 | 2:1 | 180 |
| 3 | +20% CIL 503 | 150 | 25 | 6:1 | 3:1 | 2:1 | 220 |
| 4 | | 225 | 75 | 3:1 | 2:1 | 1.5:1 | 40 |
| 5 | +20% CIL 503 | 225 | 75 | 3:1 | 2:1 | 1.5:1 | 70 |
| 6 | | 225 | 75 | 3:1 | 1:1 | 3:1 | 190 |
| 7 | | 75 | 25 | 3:1 | 1:1 | 3:1 | 170 |
| 8 | +20% CIL 503 | 225 | 75 | 3:1 | 1:1 | 3:1 | 240 |

FIGS. 3 and 4 show a generally rectangular two-ply pillow-type sack 1 having an inner wall 2 formed of blown linear low density polyethylene film (3 mil) manufactured from "2045" linear low density polyethylene resin (Dow Chemical Co.), and an outer ply 3 (3.5 mil) of uni-axially oriented linear low density polyethylene film made from blowing and cold drawing a polyethylene blend consisting of linear low density polyethylene (4 parts, density 0.918, melt index 0.5—ESCORENE 1030*) and low density polyethylene (1 part, density 0.923, melt index 0.3—CIL 503*) in a process operated with the parameters as given for resin No. 8 in the Table.

The sack 1 has thus a two-ply back wall 4, and a two-ply ironr wall 5 made up of first and second partially overlapping panels 6 and 7. The outer ply 3 of back wall 4 is continuous with the outer wall 3 of front wall 5 except where separated and joined together by 12 joined together around the entire periphery of the bag. Front side 11 consists of an inner wall 13 and an outer wall 14 formed of blown linear low density polyethylene (4 mil), and a middle wall 15 of the same uni-axially oriented linear low density polyethylene film as for FIG. 3 (3.5 mil). Back side 12 is of an identical construction.

Front side 11 has partially overlapping panels 16 and 17 heat sealed together longitudinally to form a three-ply tube open only to form a self-closing filling sleeve 18. The tube is heat sealed at both ends 19 to form a complete valved bag of the type illustrated in our U.S. Pat. No. 3,833,166. In the embodiment shown the bag has its lateral edges 20 tucked in and heat sealed in the longitudinal region 21 through twleve layers of film.

It will be noted that in all the heat seal areas the uni-axially oriented film is never sealed to itself but always has a double layer of non-oriented film between mating seal surfaces even in the twelve-ply heat seal areas 19.

It is, of course, desirable to have this tucked-in multiple seal area to give the filled bag a squared configuration.

Again, it will be appreciated that tubing could be substituted for sheeting in layers 13 and 14.

Besides the advantage of allowing the bag to be gusset sealed, the outer ply can be reverse printed to lock the print between plies 14 and 15 to protect it from abrasion in transit. Additionally, a small amount (0.5%) of 40 mesh high molecular weight high density polyethylene resin can be incorporated in layer 14 during extrusion to produce a pebbled surface to confer excellent handling properties on the filled bags.

FIG. 7 shows a polyethylene heat seal of a bag loaded with product wherein the seal is under tension due to the product acting in a manner tending to separate the plies. The figure shows a polyethylene heat seal mass 50 resulting from the fusion of part of the two oriented high density polyethylene films 51 and the two non-oriented linear low density polyethylene films 52. Integral with heat seal mass 50 at heat seal margin 53 are laminated seals 54, extending along each of the two adjacent plies 51 and 52. There is a relatively minor lamination seal 55 between the two plies 52.

The presence of the laminated seal integral with the heat seal can be accomplished by the application of a gradient heat seal bar unit to the films whereby the lamination is effected at the same time as the heat seal. Alternatively, it can be accomplished in a two-stage operation wherein a laminated seal is first made, typically of a 1″ width, by joining the plies at a temperature lower than the melting point of the uni-axially oriented polyethylene (to prevent destruction of the orientation), typically 240° F. Subsequently, a side weld heat seal is made through the laminated section by the application of temperature and pressure.

FIG. 8 shows a sheet 110 of uni-axially oriented linear low density polyethylene (as for FIG. 3) of 1.5 mil thickness and a sheet 111 of low density polyethylene of 0.25 mil thickness laminated thereto. The laminated sheets may be prepared by extrusion lamination.

It is preferred that the low density polyethylene in contact with the uni-axially oriented ply has as low a melting point as possible and be as fluid as possible when melted. These characteristics are generally achieved using low density polyethylene polymers with relatively low tensile yield strength. It is, therefore, desirable that the inner layer of the two-ply structure be a co-extrusion with only a thin layer, typically 0.25 mil thick, of low melt temperature, high melt index film on the layer in direct contact with the unti-axially oriented film.

We have found that the thickness of the inner layers of low density polyethylene required to produce an acceptable heat seal will depend greatly on the elasticity of the uni-axially oriented film to be used, i.e., the less elastic the uni-axially oriented film the thicker the low density polyethylene film must be. Relative thicknesses of all the polyethylene layers can be readily determined by the skilled man.

I claim:

1. A thermoplastic sack comprising film produced by the following process:

extruding a molten linear low density polyethylene through a die having a predetermined diameter to form an extruded tube having a length;

forming an air bubble in said tube, said bubble having a diameter, a ratio of said bubble diameter to said die diameter defining a blow ratio (BR); and cold drawing said tube in a single direction to provide a uni-axially oriented linear low density polyethylene drawn tube with a length, a ratio of said drawn tube length to said tube length defining a draw ratio (DR) such that a DR/BR ratio falls between 2:1 and 5:1.

2. A sack as claimed in claim 1 wherein said linear low density polyethylene contains a minor amount of low density polyethylene.

3. A sack as claimed in claim 1 wherein said linear low density polyethylene contains a minor amount of high density polyethylene.

4. A sack as claimed in any one of claims 1, 2, or 3 wherein said sack comprises a multi-layer laminate with at least one layer of compatible ethylene polymers or copolymers being laminated to said uni-axially oriented linear low density polyethylene tube.

5. A sack as claimed in claim 4 wherein said compatible ethylene polymer includes a low density polyethylene.

6. A sack as claimed in any one of claims 1, 2, or 3 wherein said sack comprises a front wall and a back wall, each of said front wall and said back wall comprising a ply of aid uni-axially oriented linear low density polyethylene, and wherein interposed between said front wall and said back wall are two inner plies of low density polyethylene.

7. A sack as claimed in any one of claims 1, 2, or 3 wherein the sack is a multi-ply sack having a single ply of said uni-axially oriented linear low density polyethylene.

8. A sack as claimed in claim 7 wherein the different plies of the sack are made of different thermoplastic film.

9. A thermoplastic film produced by the following process:

extruding a molten linear low density polyethyene through a die having a predetermined diameter to form an extruded tubular film having a length;

forming an air bubble in said extruded tubular film, said bubble having a diameter, a ratio of said bubble diameter to said die diameter defining a blow ratio (BR); and cold drawing said tubular film in a single direction to provide a uni-axially oriented linear low density polyethylene drawn tubular film with a length, a ratio of said drawn tubular film length to said tubular film length defining a draw ratio (DR) such that a DR/BR ratio falls between 2:1 and 5:1.

10. A thermoplastic film according to claim 9, wherein said film further includes at least one layer of a compatible ethylene polymer or copolymer.

11. A method of manufacturing a thermoplastic film, comprising the steps of:

extruding a molten linear low density polyethylene through a die having a predetermined diameter to form an extruded tubular film having a length;

forming an air bubble in said extruded tubular film, said bubble having a diameter, a ratio of said bubble diameter of said die diameter defining a blow ratio (BR);

cold drawing said extruded tubular film in a single direction to provide a uni-axially oriented linear low density polyethylene drawn tubular film having a length, a ratio of said drawn tubular film length to said tubular film length defining a draw ratio (DR) such that a DR/BR ratio falls between 2:1 and 5:1.

12. A method according to claim 11 wherein said extruding step includes the step of extruding a molten linear low density polyethylene having a minor amount of low density polyethylene.

13. A method according to claim 11 wherein said extruding step includes the step of extruding a linear low density polyethylene having a minor amount of high density polyethylene.

14. A thermoplastic sack comprising film formed of uni-axially oriented linear low density polyethylene having a DR/BR ratio of between 2:1 and 5:1, said DR being defined as a ratio of a length of drawn film to a length of undrawn film, said BR being defined as a ratio of a bubble diameter to a die diameter.

15. A sack according to claim 14 wherein said linear low density polyethylene film contains a minor amount of low density polyethylene.

16. A sack according to claim 14 wherein said linear low density polyethylene film contains a minor amount of high density polyethylene.

* * * * *